(No Model.)
C. T. WARREN.
ROTARY WATER METER.
No. 328,734. Patented Oct. 20, 1885.
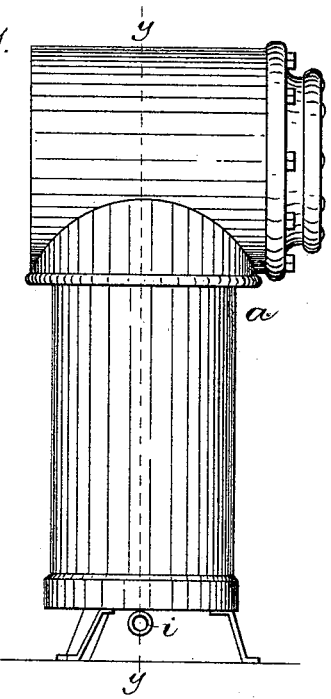
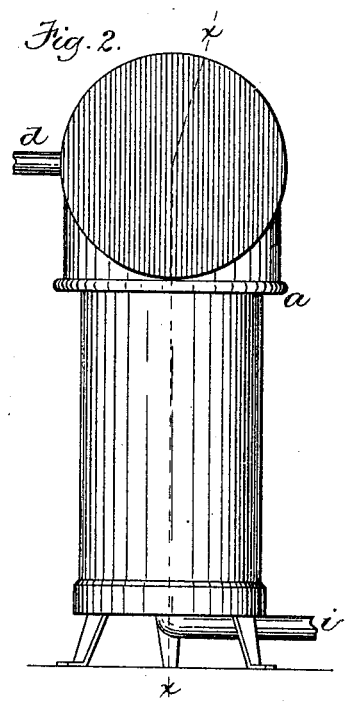
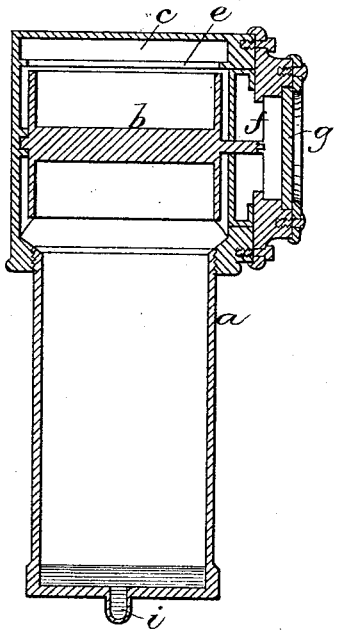
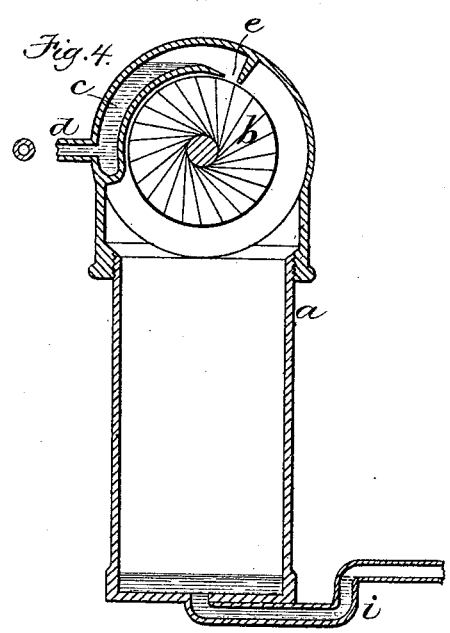
Witnesses.
H. Brown
A. L. White
Inventor.
C. T. Warren
by Wright & Brown
Attys.

UNITED STATES PATENT OFFICE.

CHARLES T. WARREN, OF BOSTON, ASSIGNOR OF ONE-HALF TO E. B. WELCH, OF CAMBRIDGE, MASSACHUSETTS.

ROTARY WATER-METER.

SPECIFICATION forming part of Letters Patent No. 328,734, dated October 20, 1885.

Application filed April 12, 1884. Renewed March 5, 1885. Serial No. 157,809. (No model.)

*To all whom it may concern:*

Be it known that I, CHARLES T. WARREN, of Boston, in the county of Suffolk and State of Massachusetts, have invented certain improvements in Water-Meters, of which the following is a specification.

This invention has for its object to provide a simple water-meter adapted to measure accurately, and of such construction that its effectiveness will not be impaired by the presence of sand and other foreign matter in the water.

The invention consists in a meter comprising a reservoir or chamber adapted to receive water from the source of supply, deprive it of the pressure or force which impels it through the pipes, and allow it to fall only by gravitation upon a wheel adapted to be rotated by the falling water, the arbor of the wheel being adapted to operate suitable indicating mechanism.

The invention also consists in the provision of a sealed air-space between the inlet and outlet passages, whereby pressure is imparted to the outflowing water by the compressed air, all of which I will now proceed to describe.

Of the accompanying drawings, forming a part of this specification, Figure 1 represents a side elevation of the casing of my improved meter. Fig. 2 represents an end elevation of the same. Fig. 3 represents a section on line $x$ $x$, Fig. 2. Fig. 4 represents a section on line $y$ $y$, Fig. 1.

The same letters of reference indicate the same parts in all the figures.

In the drawings, $a$ represents the casing of my improved meter, having in its upper portion a wheel, $b$, which is journaled so as to rotate freely in the casing, and has buckets adapted to receive water which rotates the wheel. The wheel $b$ is preferably of the overshot kind, its axis being substantially horizontal.

$c$ represents a reservoir or chamber supported by the casing or formed as a structural part thereof.

$d$ represents the inlet-pipe through which the water passes under pressure into the lower portion of the chamber $c$. Said chamber has an outlet, $e$, which is of considerably larger capacity than the inlet, and is arranged at a higher point than the inlet, as shown in Fig. 4. The water entering the chamber $c$ is therefore deprived of its pressure or force, and simply accumulates in the chamber and overflows from the apron-shaped outlet $e$ and falls with a force due only to gravitation, and practically without acceleration, into the buckets of the wheel $b$. The outlet $e$ is substantially of the same width as the wheel, and is located over and at one side of the center of the wheel, so that the water falling into the buckets rotates the wheel continuously in one direction and is discharged from the buckets into the casing below the wheel.

The arbor of the wheel may be provided with a pinion adapted to operate a suitable train of gearing and indicating hands or devices in a cavity, $f$, in the casing, said casing being covered by a light of glass, $g$.

It will be seen that the quantity of water entering the casing $a$ is accurately measured by the rotation of the wheel, the absence of impelling force or pressure enabling the water to rotate the wheel at a rate exactly proportioned to the volume of water entering the casing. The wheel is therefore enabled to rotate without frictional contact with the casing, so that there are no rubbing surfaces to be injured by sand or grit in the water or by muddy water. The wheel is in fact entirely surrounded by an air-space, as shown in Figs. 3 and 4, so that even gravel-stones can pass freely into the buckets of the wheel and out therefrom without detriment to the wheel or casing. The water leaves the casing through an outlet, $i$, in the lower part thereof. The casing has no openings excepting those through which the water enters and escapes. The air in the casing is therefore confined therein by the water in the chamber and in the outlet. This confined air enables the water, after passing through the outlet $i$, to rise in the pipe, communicating with the outlet as high as it may be desired to carry it, the confined air being compressed between the two columns of water in proportion to the height to which said water rises in the pipe through which it is conducted, and thus supporting the column of water in said pipe. The original pressure is therefore virtually restored to the water by the confined air.

This improved meter may be used for measuring any liquid.

I claim—

1. The combination, in a liquid-meter, of a receiving-chamber into which the liquid enters near the bottom and is deprived of the force or pressure derived from its source, a wide exit at the top of the receiving-chamber, from which the liquid flows by gravity alone, and a measuring-wheel arranged to receive and be rotated by the gravitating water, substantially as described.

2. The combination, in a liquid-meter, of an inlet-pipe, a receiving-chamber into which the liquid flows and is deprived of its force or pressure, an apron-shaped exit from the top of said chamber, from which the liquid falls by gravity, a measuring-wheel in close proximity to said exit, into which the gravitating liquid falls, and a space to confine a body of air between the reservoir and outlet-passage, whereby an outflowing column of water may be supported, as set forth.

3. In a liquid-meter, a casing having inlet and outlet passages, but otherwise imperforate, an air-space containing compressed air, and a measuring bucket-wheel adapted to be rotated in said compressed air by the water from the inlet-passage, and the compressed air being adapted to support a column of water in the outlet-pipe, substantially as described.

In testimony whereof I have signed my name to this specification, in the presence of two subscribing witnesses, this 10th day of April, 1884.

CHARLES T. WARREN.

Witnesses:
C. F. BROWN,
A. L. WHITE.